Jan. 8, 1946. S. H. STUPAKOFF ET AL 2,392,427
LATHE
Filed Dec. 9, 1942 3 Sheets-Sheet 3
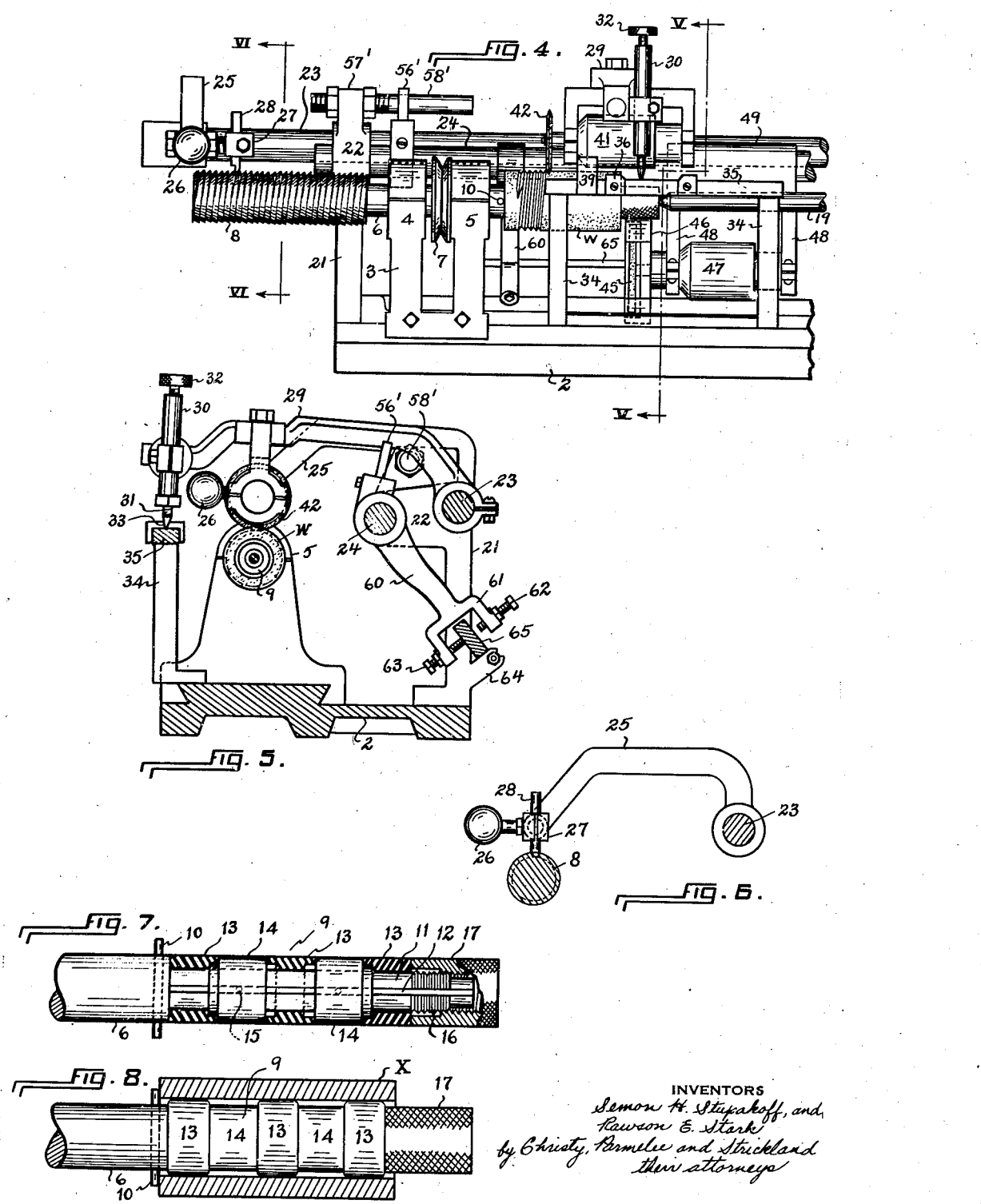
INVENTORS
Semon H. Stupakoff, and
Rawson E. Stark
by Christy, Parmelee and Strickland
their attorneys Patented Jan. 8, 1946

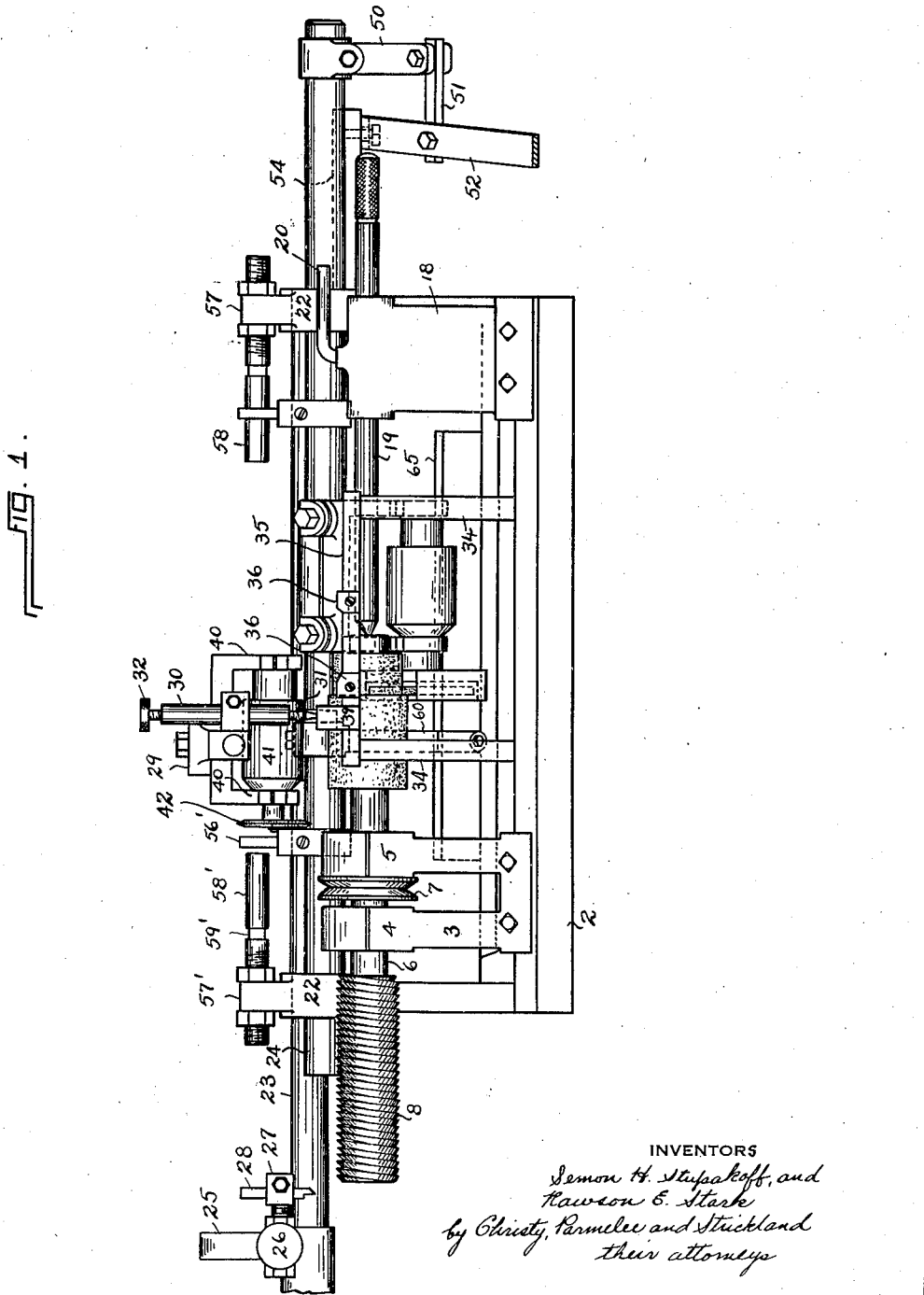

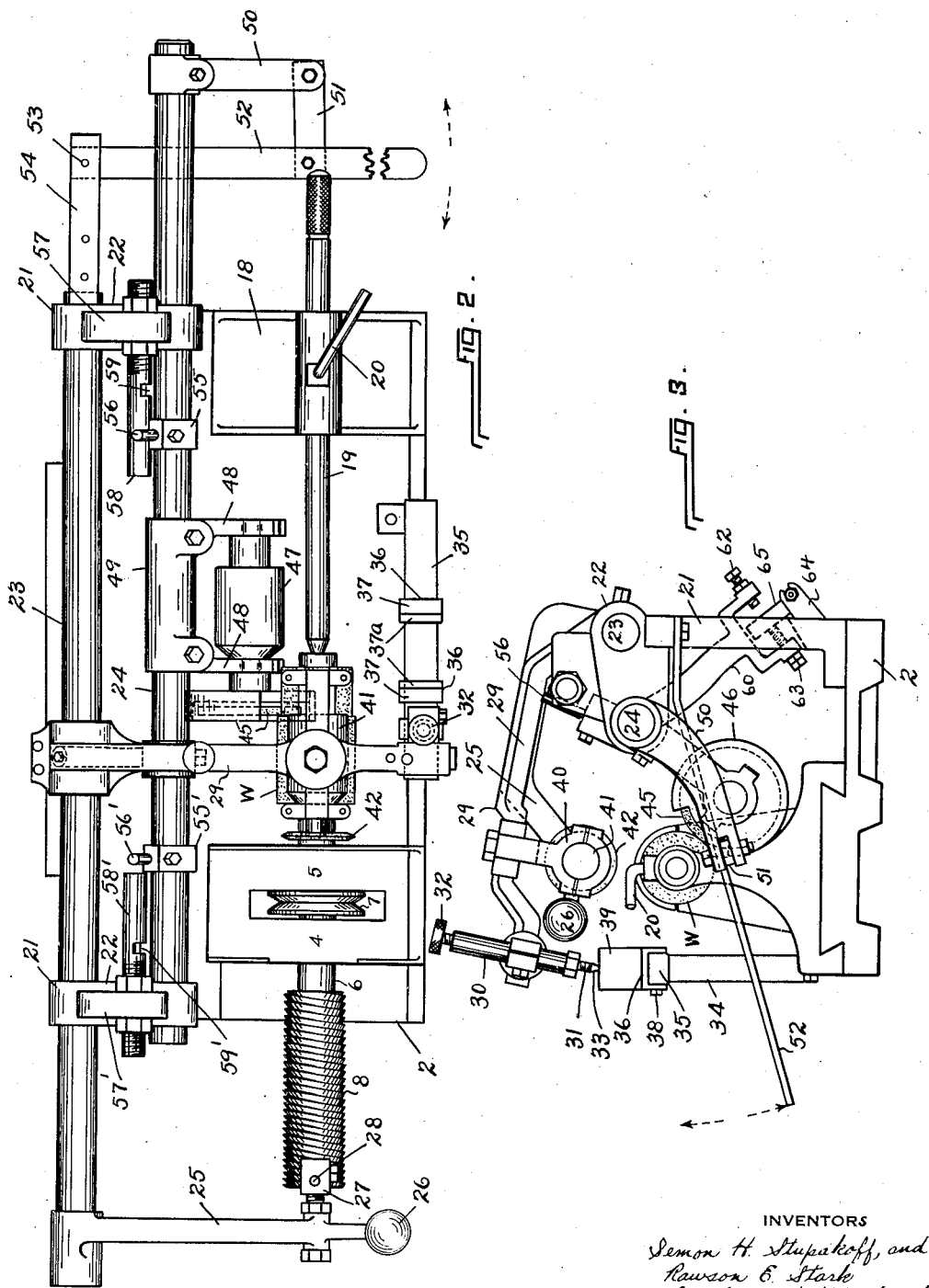

2,392,427

UNITED STATES PATENT OFFICE 2,392,427

LATHE

Semon H. Stupakoff, Latrobe, and Rawson E. Stark, Greensburg, Pa., assignors to Stupakoff Ceramic & Manufacturing Co., Latrobe, Pa., a corporation of Pennsylvania Application December 9, 1942, Serial No. 468,411

11 Claims. (Cl. 51—50)

This invention is for an improvement in turning and threading lathes and is for a lathe especially designed and intended for use in the manufacture of non-metallic coil forms, as for example, coil forms made of ceramic composition, as steatite porcelain.

Various types of radio equipment require insulating cores or forms about which wire is wrapped to form an inductance. Extreme accuracy is required in such devices. The surface of the core or form is threaded to receive the convolutions of wire and hold them in fixed spaced relation. The forms must be of a predetermined fixed diameter which must be adhered to within very close tolerances and they must be of predetermined length. In some cases it is necessary that the core be frusto-conical in shape or that a portion of it at least be tapered.

The present invention has for its primary object to provide a lathe especially intended for performing this kind of work. The lathe is designed so that the work piece can be quickly and rapidly mounted thereon, the necessary operations performed, and the piece easily removed. Moreover, the lathe is of such construction that the necessary operations can be quickly and rapidly carried out by unskilled operators. Provision is made whereby the thread-cutting operation will begin at a predetermined point and terminate at another predetermined point. Provision is also made whereby the part may be very quickly and rapidly reduced to its desired diameter or contour and cut off to length, the arrangement being such that the cutting off operation can only be performed at predetermined definite points. This prevents the operator from spoiling the piece by cutting it in the wrong place.

The invention may be more fully understood by reference to the accompanying drawings, in which Figure 1 is a front elevation of the lathe embodying our invention;

Figure 2 is a top plan view of the lathe shown in Figure 1;

Figure 3 is an end view;

Figure 4 is a detailed view in front elevation showing the operation of thread cutting on the core piece;

Figure 5 is a transverse vertical section in the plane of line V—V of Figure 4;

Figure 6 is a vertical section in the plane of line VI—VI of Figure 4;

Figure 7 is a detailed view, partly in section and partly in elevation, of one form of chuck for holding the work piece; and Figure 8 is a view similar to Figure 7 showing the chuck expanded within the work piece.

Referring to the drawings, the lathe is provided with a bed plate 2 on which is mounted a headstock 3 having spaced bearings 4 and 5 for a shaft 6. On the shaft 6 between the two bearings 4 and 5 is a drive pulley 7. The left-hand end of the shaft 6, as viewed in Figures 1, 2 and 4, overhangs beyond the end of the bed and is provided with a removable guide or templet 8, which templet is the exact diameter of the piece to be made and which has threads on the surface, the pitch of which corresponds exactly with the pitch of the threads to be formed on the work piece. The threads are of a proper shape to give the desired lead or thrust to the cutter frame hereinafter to be described.

On the opposite end of the shaft 6 is a work-holding chuck or mandrel, designated generally as 9, which is preferably in the form shown in Figures 7 and 8. As illustrated in these figures, the shaft 6 has a transverse pin 10 therethrough at the inner end of the mandrel. Forwardly of this pin the mandrel or shaft has a portion 11 of reduced diameter along which is a keyway 12. There is a series of expansible collars 13 fitted about the portion 11 and between each two expansible collars is a metal ring 14, which ring is provided with a pin 15 that enters the keyway 12 so that the collars 14 rotate with the spindle but are free to slide along on the spindle. The outermost end of the spindle is threaded, as indicated at 16 to receive a knurled nut 17. This nut bears against the endmost rubber collar 13. When the nut 17 is turned relatively to the spindle its inner end presses against the first rubber collar. This, in turn, presses against the first metal ring 14, which again in turn transmits pressure to the second rubber collar. From the second rubber collar pressure is transmitted through the second ring 14 to the third rubber collar. With this arrangement, all of the rubber collars may be equally expanded, as indicated in Figure 8.

The work piece, designated X in Figure 8 has an internal diameter slightly larger than the normal diameter of the mandrel. It is slipped over the mandrel until its inner end contacts the cross pin 10. Then the nut 17 is turned to expand the rubber collars. Due to the fact that the metal ring 14 between the rubber collars are keyed to the shaft and frictionally press against the rubber, the rubber collars cannot turn relatively to the spindle. The work piece is thus frictionally held by the rubber collars to rotate with the spindle. To remove the work piece the nut 17 is turned in the opposite direction and the resilience of the rubber rings causes the mandrel to collapse. This operation of mounting the work piece on the mandrel can be performed very quickly and rapidly and does not require a skilled machinist to apply and remove the work piece.

Mounted on the bed of the machine in line with the headstock there is shown a tail stock 18 having a centering pin 19 therein, the headstock being provided with a handled set screw 20 for tightening the centering pin 19. The centering pin 19 is used in extraordinary circumstances but normally this part of the machine is not required.

At the back of the bed of the lathe are two uprights 21 which carry bearing elements 22 at the top thereof. These bearing elements support two parallel longitudinally extending shafts. The shaft at the rear is designated 23 and the other shaft is designated 24. The shaft 23 is both rotatable and slidable in the bearing members 22. At the free left-hand end of the shaft 23, as viewed in Figures 1 and 2, is a lever 25 that projects forwardly and which has a weighted handle 26 at the free outer end thereof. This lever also carries near its outer end an adjustable clamp 27 that holds a follower pin 28. The pin 28 is adapted to be engaged with the threads of the mandrel 8 so that when the mandrel 8 is rotated with the pin 28 engaged therewith, longitudinal movement will be imparted to the shaft 23.

Fixed to the shaft 23 between the two bearings 22 is a forwardly extending arm or arbor 29. At the free end of this arbor is a holder 30 through which passes a vertically adjustable pin 31. The upper end of the pin is illustrated as having a knurled head 32 to permit the pin to be turned for threading it up or down in the holder while the lower end of the pin 31 terminates in a rounded, hardened point 33.

Secured to the bed of the lathe at the front thereof are two uprights 34 which are best seen in Figures 1 and 4 and on these uprights is carried a longitudinally extending rail 35. Mounted on the rail 35 are one or more saddle-like members 36 having cam surfaces 37 thereon. These cam surfaces are indicated as having a high flat top with a portion 37a that inclines down to the surface of the rail 35. The saddle members are adjustably held in position by set screws 38. To the left-hand side of the left-hand saddle member 36, as viewed in Figure 1, there is illustrated a block which is carried on the rail 35 and which has a flat top on which the terminal 33 of the pin 31 normally rests when the part 29 with the threading cutter hereinafter described is not being used. This block is designated 39.

Suspended from the arm or holder 29 rearwardly of the pin 31 is a clamp 40 in which is a small electric motor 41. This motor has a shaft on which is an abrasive thread cutting wheel 42.

As shown in Figures 1, 2 and 3, when the terminal of the pin 31 is on the block 39, the cutter wheel 42 is to the left-hand end of the work piece, designated W and is elevated above the periphery of the work piece W.

In operation, the operator, after putting the work piece W onto the mandrel, lifts up on the handle 26 at the left-hand end of the machine to a slight extent, which also lifts the point 31 of the pin 33 free of the support 39. Then by pulling on the handle 26 the rod 23 is caused to move lengthwise of the bed of the lathe until the abrasive wheel 42 is in a predetermined position over the work piece. Then the operator lowers the lever 25 entering the follower pin 28 in the threads of the forming mandrel 8. This lowers the cutting wheel against the periphery of the work piece and as the mandrel and work piece rotate the pin 28 follows the lead screw in the mandrel 8, sliding the shaft 23 longitudinally, and thereby moves the cutter along the work piece as the work piece is revolved to cut a thread in the periphery of the work piece in the manner illustrated in Figure 4. When the cutter has traveled a predetermined extent toward the right as viewed in Figures 1, 2 and 4, the pin 31 climbs the inclined cam surfaces 37a to lift the arbor 29 and raise the cutter wheel out of engagement with the work piece. This at the same time disengages the pin 28 from the lead screw on the guide mandrel 8.

In this way, provision is made for cutting a thread on the work. The guide mandrel 8 has a lead screw which corresponds to the thread which it is desired to produce in the work piece and, since the mandrel 8 makes one revolution for each revolution of the work piece, the two being on the same shaft, no gearing is necessary, as is the case with conventional thread cutting lathes. In the ordinary course of using the machine the saddle members 26 constitute primary means for gauging the beginning and the end of the threading operation and are less important as cams for actually lowering and lifting the cutter, although they may also be used in this way. The pin 31, riding on the surface of the rail or steady rest 35 between the saddle elements 36, regulates the depth to which the thread is cut and prevents the follower pin 28 from bearing too hard in the lead screw of the guide mandrel 8.

The abrasive wheel 42 is primarily for the purpose of cutting threads. For cutting the work piece to length, for turning it down to a proper diameter and performing machining operations other than threading, a second abrasive wheel 45 is provided. The abrasive wheel 45, except for a small portion of its periphery, is enclosed in a guard 46 and is carried on the shaft of a small motor 47. This motor is clamped at the ends of two arms 48 that extend down from a sleeve 49 that is fast on the shaft 24. The shaft 24, like the shaft 23, can move back and forth in a longitudinal direction and can also be rotated in the bearings 22. By moving the shaft 24 back and forth the abrasive wheel 45 is caused to travel along the work piece and by rotating the shaft 24 the abrasive wheel is moved toward and away from the center of the work piece.

For operating the shaft 24 there is provided on its right-hand end a fixed arm 50 to the free end of which is attached a link 51. The other end of the link 51 connects to a lever 52. The free end of the lever 52 projects forwardly to provide a handle which the operator may grasp. The rear end of the lever 52 is loosely pivoted at 53 to a fixed support 54 extending laterally from the right-hand post 21. The loose pivot for the lever 52 enables the lever 52 to be swung upwardly, as indicated by the arrow in Figure 3, and also permits it to be swung horizontally, as indicated by the arrow in Figure 2. Any movement of the lever 52 is transmitted through the link 51 and arm 50 to the shaft 24.

By moving the lever 52 upwardly from the position shown in Figure 3 it is apparent that the abrasive wheel 45 will swing upwardly so that it will not only engage the periphery of the work piece but actually cut entirely through the work piece to the mandrel. This is the manner in which the cutting-off operations are performed and in order that the wheel may be brought into cutting-off position only at predetermined locations and can then be lifted only sufficiently to cut through the work piece without cutting into the supporting mandrel, an adjustable stop arrangement is provided. Adjustably clamped on the shaft 24 near the right-hand bearing 22 is a collar 55 having an upwardly projecting finger 56 thereon. Carried on the bearing member 22 is a lug 57 in which is adjustably fixed a horizontally extending pin 58. This pin has a notch 59 therein.

Likewise, near the left-hand bearing 22 the shaft 24 has another adjustable collar 55' with a finger 56' projecting radially therefrom. Lug 57' on the left-hand bearing block 22 carries an adjustably fixed pin or shaft 58' in which is a notch 59'. The collars 55 and 55' are so positioned on the shaft 24 that no matter where the shaft 24 is moved longitudinally, one or the other of the fingers 56, 56' will be alongside its respective pin or shaft 58 or 58'. For example, in Figure 2 the finger 56' is beyond its pin 58' but the finger 56 is opposite its pin 58. If the shaft 24 is moved to the left as viewed in Figure 2, finger 56' will come alongside shaft 58' before finger 56 clears the shaft or stud 58.

The radial position of the collars 55 and 55' with their respective fingers 56 and 56' is such that the shaft 24 can rotate to lift the cutter wheel 45 a predetermined distance such as may be necessary to perform some machining operation on the surface of the work piece. Beyond this range of movement, however, the shaft 24 cannot rotate because one or the other of the fingers 56 or 56' will be brought tight against its stud 58 or 58'. Only when one of the fingers 56 or 56' is clear of its respective stud and the other finger is opposite its respective notch 59 or 59' can the shaft 24 be rotated beyond this position. If, however, one of the fingers happens to be in register with its notch and the other finger is clear of its stud, an additional slight movement may be given the shaft 24 sufficient to raise the cutter wheel to a point where the work piece will be severed. When the finger 56 or 56' hits the inner limit of the notch the shaft 24 cannot rotate further. This prevents the cutter wheel from injuring the mandrel after the work piece has been cut off.

Viewing Figure 2, for example, the fingers 56 and 56' are so located that neither of them is opposite its respective notch 59 or 59' and therefore the cutter wheel could not be raised to a distance sufficient to cut the work piece in two. Before this could be done it would be necessary to shift the shaft 24 to bring the finger 56' into register with the notch 59', at which time the finger 56 would be entirely clear of the stud 58, or it would be necessary to shift the shaft 24 toward the right to bring the finger 56 into register with the notch 59, in which case finger 56' would be entirely clear of its limiting stud 58'. Only in two positions, therefore, can the cut-off wheel be raised to a point where it will cut the work piece in two and these points can be adjustably predetermined for a particular piece of work through the adjustment of the collars and the limiting studs 58 and 58'.

As hereinbefore indicated, the fingers 56 and 56' allow some movement of the wheel 45 into engagement with the work piece but the range of movement is limited to a distance less than that required for cutting the piece in two. To control the extent and range of this free movement another limiting and guiding mechanism is provided which will now be described. Fixed to the shaft 24 is a downwardly and rearwardly extending arm 60, having a yoke 61 at the free end thereof. In each arm of the yoke is a set screw, these set screws being designated 62 and 63. Mounted on a bracket 64 at the rear of the machine is a templet 65 which is positioned between the inner terminals of the two set screws 62 and 63. As the shaft 24 moves back and forth the yoke 61 moves along the templet 65. When the lever 52 is operated to rotate the shaft 24 to raise the cutter wheel 45 the set screw 63 moves away from the templet and the set screw 62 moves toward the templet. The clearance between the set screw 62 and the templet limits the arc through which the arm 60 may swing and therefore limits the arc through which the shaft 24 can rotate. If it is desired to machine the work piece so that it will, for example, have a tapered periphery instead of being a cylinder, the templet 65 may be wedge-shaped. The weight of the abrasive wheel and its motor 47 tends to urge the cutter away from the work and to hold the set screw 63 against the surface of the templet. If the templet is wedge-shaped it is apparent that the yoke 61 will be cammed toward the left as viewed in Figure 5, tending to gradually raise the cutter wheel as the cutter wheel is moved along the work piece, thus causing a taper to be ground on the surface of the work piece.

By making the templet of a proper shape and of sufficient length it may control the movement of the cutter wheel 45 to the cutting-off position and thus also accomplish the function that is accomplished by the finger 56 and 56'. More often, however, it is desirable to use but a short templet 65 and in many cases to use no templet at all and to rely on the fingers 56 and 56' to limit the swinging movement of the grinding wheel 45 to both the surfacing and the cutting-off positions. It is more simple, where there is no taper or particularly peculiar shape involved, to use the fingers 56 and 56' rather than a templet. Also, there are cases in which the templet 65 may be a relatively short templet, in which case it is used to control some operation on the work piece while the fingers 56 and 56' control other operations.

The arbor 29 is upwardly arched so that it will clear the sleeve 49 on the shaft 24, permitting the thread-cutting grinder 42 to move in one direction over the grinding wheel 45 and its associated parts, when perhaps these parts are moving in the opposite direction. The two grinders can be shifted back and forth without interference from each other.

In using the lathe for the production of ceramic articles the ceramic forms are cut from a length of extruded ceramic material, preferably before the material is fired. The work piece which has been formed in this way is then put on the mandrel of the machine, preferably before the ceramic has been fired, and the necessary machining operations, including turning the surface, cutting off accurately to length, the machining of end faces and threading, or any other like operations, are carried out, after which the machined piece is fired. The mandrel for holding the work is such that the work piece can be very easily put on it and secured to the mandrel without there being relative rotation between the work and the mandrel. This operation requires no special skill on the part of the operator. The performance of all succeeding operations can then be carried out and unskilled labor can very quickly be trained to perform the sequence of steps required while the construction of the lathe is such that there is very little likelihood of a piece being damaged due to the cutter wheel being raised at the wrong time or raised too far. The cutting of the threads can always be indexed to an index mark, not shown, on the mandrel 8 so that the length of the thread produced on the work piece will be absolutely uniform on a succession of pieces. The lathe can be cheaply constructed and very quickly adjusted by a mechanic for the performance of the particular work which is to be run.

While we have illustrated and described one particular embodiment of our invention, it will be understood that this is by way of illustration and that various changes and modifications may be made in the construction within the contemplation of our invention and under the scope of the following claims.

We claim:

1. A lathe adapted for turning, threading and cutting to length coil forms of ceramic composition of the character described comprising a fixed spindle bearing support a spindle having a work-holding mandrel thereon, a rock shaft disposed parallel with the spindle and supported for axial as well as rotative movement, a cutter wheel mounted on said rocker arm in such a manner as to be movable in an arc toward and away from the axis of the spindle and movable also lengthwise of the axis of the spindle, and adjustable means including an adjustably fixed control member disposed in parallel relation to said rock shaft, and a member carried by said rock shaft and adjustable axially thereof and cooperating with said control member for limiting the arcuate movement of the cutter wheel to different ranges along the longitudinal path of travel of the cutter wheel.

2. A lathe adapted for turning, threading, and cutting to length coil forms of ceramic composition of the character described comprising a fixed spindle bearing support, a spindle having a work-holding mandrel thereon, a rock shaft parallel with the spindle and supported for axial as well as rotative movement, a bracket carried on said rock shaft, a motor and abrasive wheel driven by the motor mounted on said bracket whereby the abrasive wheel may be moved back and forth and in an arc relatively to the spindle, means for operating the rock shaft to rotate it and to move it longitudinally, and adjustable means for limiting the rotative movement of the rock shaft to different ranges in different positions, said adjustable means including an arm extending from said rock shaft, a templet disposed in parallel relation with said rock shaft, and means on said arm arranged to cooperate with said templet to limit rotative movement of the rock shaft in either direction within an adjustably determined range, for any one of a number of given longitudinal positions along said templet.

3. A lathe of the character described comprising a spindle having a work-holding mandrel thereon, a rock shaft parallel with the spindle and supported for axial as well as rotative movement, a bracket carried on said rock shaft, a motor and abrasive wheel driven by the motor mounted on said bracket whereby the abrasive wheel may be moved back and forth in an arc relative to the spindle, means for operating the rock shaft to rotate it and to move it longitudinally, and an arm extending radially from said rock shaft having a yoke at the free end thereof, opposed set screws in said yoke providing adjustable abutments, and a templet along which the yoke moves and positioned between said abutments for limiting the rocking movement of said rock shaft.

4. A lathe of the character described comprising a spindle having a work-holding mandrel thereon, a rock shaft parallel with the spindle and supported for axial as well as rotative movement, a bracket carried on said rock shaft, a motor and abrasive wheel driven by the motor mounted on said bracket whereby the abrasive wheel may be moved back and forth and in an arc relatively to the spindle, means for operating the rock shaft to rotate it and to move it longitudinally, a fixed templet, and means carried on the rock shaft engaging opposite faces of the templet for regulating the arcuate movement of said rock shaft.

5. A lathe of the character described comprising a bed structure, a spindle having a work-holding mandrel supported over the bed structure, a rock shaft supported over the bed structure parallel with the spindle, said rock shaft being mounted for axial as well as rotative movement, an abrasive wheel and driving motor for said wheel eccentrically supported on the rock shaft whereby rotation of said rock shaft moves the abrasive wheel toward or away from the work holder on the spindle and longitudinal movement of the shaft causes the abrasive wheel to move along the work holder, and a common operating element for sliding and rotating the rock shaft.

6. A lathe of the character described comprising a bed structure, a spindle having a work-holding mandrel supported over the bed structure, a rock shaft supported over the bed structure parallel with the spindle, said rock shaft being mounted for axial as well as rotative movement, an abrasive wheel and driving motor for said wheel eccentrically supported on the rock shaft whereby rotation of said rock shaft moves the abrasive wheel toward or away from the work holder on the spindle and longitudinal movement of the shaft causes the abrasive wheel to move along the work holder, and a forwardly projecting hand lever movable in a vertical arc and in a horizontal arc operatively connected with said rock shaft for operating it.

7. A lathe of the character described comprising a bed structure, a spindle having a work-holding mandrel supported over the bed structure, a rock shaft supported over the bed structure parallel with the spindle, said rock shaft being mounted for axial as well as rotative movement, an abrasive wheel and driving motor for said wheel eccentrically supported on the rock shaft whereby rotation of said rock shaft moves the abrasive wheel toward or away from the work holder on the spindle and longitudinal movement of the shaft causing the abrasive wheel to move along the work holder, a common operating element for sliding and rotating the rock shaft, a fixed stud shaft adjustably fixed relatively to the bed parallel with said rock shaft and having a notch therein, and a collar adjustably mounted on the rock shaft having a finger thereon adapted to contact said stud shaft when the rock shaft is rotated and to enter said notch when it is in line with said notch, said stud shaft and collar with its finger serving to limit the range of arcuate movement of the rock shaft, the notch permitting greater movement at the point where the finger is in alignment with the notch.

8. A lathe of the class described comprising a bed structure having a spindle supported thereon, said spindle having a work-holding mandrel at one end thereof and having a threaded guide mandrel at the other end thereof, a rock shaft supported over the bed parallel with the spindle and being supported to slide axially as well as rotate about its axis, an arm extending forwardly from said shaft having a means thereon adapted to engage the threaded guide mandrel whereby said mandrel may be engaged or disengaged by arcuate movement of the rock shaft, an arm on said rock shaft extending forwardly therefrom over the work-holding mandrel, said arm having a supporting post at its forward end, a rest structure mounted on the bed forwardly of the spindle on which said post may rest, and a thread cutting tool suspended from said arm for engagement with a work piece on the work-holding mandrel.

9. A lathe of the class described comprising a bed structure having a spindle supported thereon, said spindle having a work-holding mandrel at one end thereof and having a threaded guide mandrel at the other end thereof, a rock shaft supported over the bed parallel with the spindle and being supported to slide axially as well as rotate about its axis, an arm extending forwardly from said shaft having a means thereon adapted to engage the threaded guide mandrel whereby said mandrel may be engaged or disengaged by arcuate movement of the rock shaft, an arm on said rock shaft extending forwardly therefrom over the work-holding mandrel, said arm having a supporting post at its forward end, a rest structure mounted on the bed forwardly of the spindle on which said post may rest, and a motor driven abrasive thread cutting wheel suspended from the arm intermediate the ends thereof and adapted to engage a work piece on the work-holding mandrel, the rocking of the rock shaft serving to raise and lower the abrasive wheel with respect to the work piece.

10. A lathe of the class described comprising a bed structure having a spindle supported thereon, said spindle having a work-holding mandrel at one end thereof and having a threaded guide mandrel at the other end thereof, a rock shaft supported over the bed parallel with the spindle and being supported to slide axially as well as rotate about its axis, an arm extending forwardly from said shaft having a means thereon adapted to engage the threaded guide mandrel whereby said mandrel may be engaged or disengaged by arcuate movement of the rock shaft, an arm on said rock shaft extending forwardly therefrom over the work-holding mandrel, said arm having a supporting post at its forward end, a rest structure mounted on the bed forwardly of the spindle on which said post may rest, and a motor driven abrasive thread-cutting wheel suspended from the arm intermediate the ends thereof and adapted to engage a work piece on the work-holding mandrel, the rocking of the rock shaft serving to raise and lower the abrasive wheel with respect to the work piece, the rest at the front of the spindle having portions thereof of greater height than other portions whereby the abrasive wheel is held out of contact with the work piece when the said post is on the higher parts of said support and engaged with the work when it is on the lower parts of said support.

11. A lathe of the class described comprising a bed structure having a spindle supported thereon, said spindle having a work-holding mandrel at one end thereof and having a threaded guide mandrel at the other end thereof, a rock shaft supported over the bed parallel with the spindle and being supported to slide axially as well as rotate about its axis, an arm extending forwardly from said shaft having a means thereon adapted to engage the threaded guide mandrel whereby said mandrel may be engaged or disengaged by arcuate movement of the rock shaft, an arm on said rock shaft extending forwardly therefrom over the work-holding mandrel, said arm having a supporting post at its forward end, a rest structure mounted on the bed forwardly of the spindle on which said post may rest, a motor driven abrasive thread-cutting wheel suspended from the arm intermediate the ends thereof and adapted to engage a work piece on the work-holding mandrel, the rocking of the rock shaft serving to raise and lower the abrasive wheel with respect to the work piece, the rest at the front of the spindle having portions thereof of greater height than other portions whereby the abrasive wheel is held out of contact with the work piece when the said post is on the higher parts of said support and engaged with the work when it is on the lower parts of said support, and spaced adjustable means on the support for determining the range of thread cutting movement of the abrasive wheel longitudinally of the work piece.

SEMON H. STUPAKOFF.
RAWSON E. STARK.